United States Patent
Ogawa et al.

(10) Patent No.: US 6,641,788 B1
(45) Date of Patent: Nov. 4, 2003

(54) ABSORBENT FOR A HYDROCARBON, AND EXHAUST GAS-PURIFYING CATALYST

(75) Inventors: Hiroshi Ogawa, Shinnanyo (JP); Hiroshi Miura, Kawasaki (JP); Masao Nakano, Hikari (JP)

(73) Assignee: Tosoh Corporation, Shinnanyo (JP)

( * ) Notice: Subject to any disclaimer, the term of this patent is extended or adjusted under 35 U.S.C. 154(b) by 0 days.

(21) Appl. No.: 09/693,999

(22) Filed: Oct. 23, 2000

Related U.S. Application Data

(62) Division of application No. 09/108,702, filed on Jul. 1, 1998, now abandoned.

(30) Foreign Application Priority Data

| Jul. 2, 1997 | (JP) | 9-177307 |
| Jul. 2, 1997 | (JP) | 9-177308 |
| Nov. 26, 1997 | (JP) | 9-324280 |

(51) Int. Cl.$^7$ ............................................ F01N 3/10
(52) U.S. Cl. .............................. 423/213.2; 423/213.7; 423/239.1; 423/239.2; 423/245.1; 95/143; 95/144; 95/147; 95/902
(58) Field of Search .................... 423/245.1, 239.1, 423/213.2, 213.7, 239.2; 95/143, 144, 147, 902

(56) References Cited

U.S. PATENT DOCUMENTS

| 3,308,069 A | | 3/1967 | Wadlinger et al. |
| 4,500,417 A | * | 2/1985 | Chen et al. ............. 208/111.15 |
| 5,164,169 A | * | 11/1992 | Rubin ........................ 423/709 |
| 5,171,553 A | | 12/1992 | Li et al. |
| 5,554,356 A | * | 9/1996 | Saxton et al. ................ 423/706 |
| 5,589,147 A | | 12/1996 | Farnos et al. |
| 5,662,869 A | * | 9/1997 | Abe et al. ................... 422/171 |
| 5,683,673 A | * | 11/1997 | Buskens et al. ............. 423/701 |
| 5,741,468 A | | 4/1998 | Saito et al. |
| 5,968,466 A | | 10/1999 | Kharas |
| 6,001,320 A | * | 12/1999 | Addiego ..................... 423/212 |
| 6,207,604 B1 | * | 3/2001 | Yamamoto et al. ...... 423/213.2 |

FOREIGN PATENT DOCUMENTS

| EP | 0 295 019 | * | 12/1988 |
| EP | 0 523 829 | | 1/1993 |
| EP | 0 585 572 | | 3/1994 |
| EP | 0 614 853 | | 9/1994 |
| EP | 0 716 877 | | 6/1996 |
| EP | 0 749 774 | * | 12/1996 |
| JP | 1-135541 | | 5/1989 |
| JP | 2-56247 | | 2/1990 |
| JP | 2-135126 | | 5/1990 |
| JP | 5-31359 | | 2/1993 |
| JP | 5-293380 | | 11/1993 |
| JP | 7-213910 | | 8/1995 |
| JP | 8-10566 | | 1/1996 |
| JP | 8-24655 | | 1/1996 |
| JP | 8-164338 | | 6/1996 |
| JP | 8-224449 | | 9/1996 |
| JP | 8-229386 | | 9/1996 |
| JP | 9-872 | | 1/1997 |
| JP | 9-38485 | | 2/1997 |
| JP | 9-175818 | | 7/1997 |

OTHER PUBLICATIONS

J. Leyrer, et al., SAE, The Engineering Society for Advancing Mobility Land Sea Air and Space International, pp. 1 to 25, "Advanced Studies on Diesel Aftertreatment Catalysts for Passenger Cars," Feb. 26 to 29, 1996.

* cited by examiner

Primary Examiner—M. Alexandra Elve
Assistant Examiner—Christina Ildebrando
(74) Attorney, Agent, or Firm—Oblon, Spivak, McClelland, Maier & Neustadt, P.C.

(57) ABSTRACT

An adsorbent for a hydrocarbon, comprising a calcined β-type zeolite showing a powder X-ray diffraction such that the sum of X-ray diffraction intensities at lattice spacings d=1.15±0.03 nm and d=0.397±0.01 nm, is at least 90% of the diffraction intensity at d=0.346±0.01 nm of Catalysis Society reference catalyst JRC-Z-HM-20(3).

9 Claims, No Drawings

ABSORBENT FOR A HYDROCARBON, AND EXHAUST GAS-PURIFYING CATALYST

This application is a continuation of application Ser. No. 09/108,702, filed Jul. 1, 1998, now abandoned.

The present invention relates to an adsorbent for a hydrocarbon. Further, the present invention relates to a catalyst for removing nitrogen oxide in an exhaust gas discharged from an internal combustion engine of e.g. an automobile, and a method for purifying an exhaust gas.

For purification of an exhaust gas containing hydrocarbons discharged from an internal combustion engine of e.g. an automobile, a method has been practically used in which a three way catalyst is contacted with the exhaust gas. However, when the exhaust gas temperature is low at the start up of an engine, the hydrocarbons are likely to be discharged as they are i.e. without being purified by the catalyst.

Therefore, for purification of hydrocarbons from an exhaust gas at a low temperature, JP-A-2-135126 proposes an exhaust gas-purifying apparatus employing an adsorbent for hydrocarbons, having at least one metal supported on a part of a monolithic substrate having Y-type zeolite and mordenite-structured zeolite coated thereon, for the purpose of adsorbing and purifying hydrocarbons. Further, many other adsorbents for hydrocarbons have been proposed wherein zeolites are used as constituting components.

For example, JP-A-5-31359 proposes a zeolite having $SiO_2/Al_2O_3$ molar ratio of at least 40; JP-A-7-213910 proposes at least one zeolite selected from the group consisting of a mordenite, β-type zeolite and ZSM-5, having a $SiO_2/Al_2O_3$ molar ratio of from 50 to 2000, and USY having a $SiO_2/Al_2O$ molar ratio of from 50 to 300; JP-A-8-10566 proposes a zeolite selected from ZSM-5, USY and β-type zeolite, having a $SiO_2/Al_2O_3$ molar ratio of at least 40; and JP-A-8-224449 proposes a zeolite having a weight ratio of silica to alumina of larger than 300, wherein a preferred zeolite is ZSM-5, zeolite Y, ZSM-11, β-type zeolite or silicalite.

Further, JP-A-8-229386 discloses a β-type zeolite prepared by adding seed crystals of β-type zeolite to a mixed gel, followed by heating at a mild temperature rising rate of from about 28 to 55° C./hr, and JP-A-9-38485 proposes, as a constituting component for an adsorbent for hydrocarbons, a β-type zeolite which has been subjected to aluminum-removing treatment so that the residual aluminum is less than 20%, whereby the degree of aluminum removal is set so that the specific surface area is maintained at a level of at least 500 $m^2/g$ Each of such methods for adsorbing and removing hydrocarbons by means of these adsorbents, is one wherein a hydrocarbon contained in an exhaust gas is once adsorbed on an adsorbent at a low temperature during the start up of an engine and kept adsorbed to a temperature at which an exhaust gas-purifying catalyst will operate, and the hydrocarbon desorbed from the adsorbent in a temperature range higher than said temperature, is purified by the exhaust gas-purifying catalyst.

At present, nitrogen oxide, carbon monoxide and hydrocarbons, which are hazardous to human bodies, in an exhaust gas discharged from a gasoline engine, are removed by a three way catalyst having Pt, Pd or Rh included on a support. In recent years, it has been attempted to disseminate a gasoline engine of a lean-burn system or a direct injection type combustion system or a diesel engine in order to reduce the discharge of carbon dioxide in view of a resource problem or an environmental problem due to warming up of the earth. The exhaust gas from such an engine contains excessive oxygen, and it is accordingly difficult to remove nitrogen oxide by a conventional three way catalyst.

As a method for removing nitrogen oxide from an exhaust gas containing excessive oxygen, there has heretofore been known a method for selective-reduction on $V_2O_5/TiO_2$ wherein ammonia is used as a reducing agent, or a method for absorption into an alkaline solution. However, ammonia is a poisonous substance as designated by law and is highly dangerous, and it is difficult to apply such a method to an automobile which is a mobile source. On the other hand, it is difficult to apply the absorption method to a mobile source such as a common automobile, from the viewpoint of the operation efficiency in e.g. supplementation or treatment of the alkaline solution.

For purification of an exhaust gas in an excessive oxygen state, many exhaust gas-purifying catalysts have been proposed, including an exhaust gas-purifying catalyst consisting of a zeolite ion-exchanged with at least one metal selected from Pt, Pd, Rh, Ir and Ru (JP-A-1-135541). The catalyst proposed in JP-A-1-135541, is one which reduces and removes nitrogen oxide by means of a reducing gas such as hydrogen or hydrocarbons contained in the exhaust gas.

Further, for the purpose of removing nitrogen oxide in an exhaust gas and suppressing discharge of hydrocarbons, it has been proposed that a hydrocarbon in an exhaust gas is adsorbed on an adsorbent at a low temperature, and by utilizing the hydrocarbon which desorbs from the adsorbent as the exhaust gas temperature rises, the performance for the removal of nitrogen oxide is further improved. The following catalysts have heretofore been proposed as exhaust gas-purifying catalysts, wherein an adsorbent for a hydrocarbon and a nitrogen oxide-removing catalyst are used in combination.

JP-A-2-56247 proposes an exhaust gas-purifying catalyst having a first catalyst layer composed mainly of a zeolite formed on a substrate and a second catalyst layer composed mainly of a noble metal catalyst having an redox ability formed thereon, as a catalyst whereby a hydrocarbon is selectively adsorbed on the zeolite in a cold state and in an air/fuel ratio rich state, and the hydrocarbon which is desorbed from the zeolite as the exhaust gas temperature rises, and nitrogen oxide, carbon monoxide and hydrocarbons in the exhaust gas are purified. JP-A-5-293380 proposes an exhaust gas-purifying catalyst comprising a catalyst containing at least Pt on porous material and on aluminosilicate, which has solid acidity and molecular sieve function, containing at least one metal selected from alkali metals and alkaline earth metals.

Further, JP-A-8-24655 proposes an exhaust gas-purifying catalyst prepared by mixing a hydrocarbon adsorbent which adsorbs a hydrocarbon in an exhaust gas and desorbs the adsorbed hydrocarbon at a temperature higher than a certain level, with a $NO_x$ catalyst having a metal supported on a crystalline metal-containing silicate, which purifies nitrogen oxide in the exhaust gas in the presence of a hydrocarbon; and JP-A-8-164338 proposes an exhaust gas-purifying catalyst, wherein a hydrocarbon adsorbent made of an inorganic crystalline molecular sieve, is supported on a substrate, a first catalyst layer comprising Pd as a catalyst metal is formed on the surface of the hydrocarbon adsorbent particles, a rare earth oxide layer composed mainly of a rare earth oxide, is formed on the first catalyst layer, and a second catalyst layer comprising at least one of Pt and Rh as a catalyst, is formed on the rare earth oxide layer.

Further, JP-A-9-872 proposes an exhaust gas-purifying system wherein an adsorbent having a hydrocarbon-adsorbing ability and a cold ignition catalytic composition comprising a noble metal and a material having electron donative and/or nitrogen dioxide absorptive and desorptive activities, are disposed in an exhaust pipe of an internal combustion engine.

In recent years, an attention has been drawn to a problem of environmental pollution due to discharge of hydrocarbons, and it is desired to improve the technology for removing such hydrocarbons.

When a zeolite is used as an adsorbent, the adsorption characteristics of a hydrocarbon are influenced substantially by the type of the hydrocarbon and the matrix structure of the zeolite. With respect to the adsorption characteristics of a hydrocarbon having a small carbon number, as the molecular diameter is small, its diffusion and migration into zeolite pores are easy, and adsorption is likewise easy. However, due to the easiness in migration of the hydrocarbon, desorption also tends to be easy, and purification tends to be inadequate, since the hydrocarbon tends to be desorbed at a temperature lower than the temperature at which the catalyst for purifying the hydrocarbon, represented by the three way catalyst, will operate. On the other hand, with respect to the adsorption characteristics of a hydrocarbon having a large carbon number, a hydrocarbon having a molecular diameter larger than the pore diameter of the zeolite, can hardly diffuse or migrate into the pores, whereby the pores of the zeolite can not function sufficiently as adsorption sites. Thus, the amount of the hydrocarbon adsorbed decreases, and the hydrocarbon will be discharged as it is i.e. without being adequately purified.

With respect to the adsorbents which have been proposed heretofore, studies have been made on adsorption characteristics for lower hydrocarbons such as ethylene and propylene or aromatic compounds such as toluene and hydrocarbons discharged from gasoline engines. However, details of adsorption characteristics relating to hydrocarbons having at least 7 carbon atoms, particularly hydrocarbons such as straight chain paraffins and polycyclic aromatic compounds, as constituting components of light oil, have not yet clearly been understood.

Further, the exhaust gas-purifying catalyst proposed as described above, exhibits some improvement in the nitrogen oxide removal activity by an adsorbed hydrocarbon, by the combination with the adsorbent for a hydrocarbon, but such an effect has been inadequate, and further improvement in the performance has been desired.

Further, the temperature of an exhaust gas from an internal combustion engine is possible to reach a level of at least 600° C. Accordingly, the adsorbent for a hydrocarbon and the exhaust gas-purifying catalyst are required to have high thermal resistance, so that the adsorption performance and the purifying activity will not decrease even when the adsorbent and the exhaust gas-purifying catalyst are exposed to such a high temperature.

It is an object of the present invention to solve the above mentioned problems of the prior art and to provide an adsorbent which has a high ability of adsorbing a hydrocarbon and which has sufficient thermal resistance, and a method for adsorbing and removing a hydrocarbon contained in a gas, by means of such an adsorbent.

Another object of the present invention is to provide an exhaust gas-purifying catalyst employing the adsorbent of the present invention and a nitrogen oxide-removing catalyst, and a method for purifying an exhaust gas.

The present inventors have conducted an extensive study on the above problems and as a result, have found that an adsorbent for a hydrocarbon, comprising a β-type zeolite having high crystallinity, has high thermal resistance, and an exhaust gas-purifying catalyst comprising a combination of such an adsorbent and a catalyst which is excellent in durability and a nitrogen oxide-removing performance, has a high nitrogen oxide-removing activity and is excellent in durability with little decrease in the activity even after being exposed to a high temperature. The present invention has been accomplished on the basis of this discovery.

Namely, the present invention provides an adsorbent for a hydrocarbon, comprising a calcined β-type zeolite showing a powder X-ray diffraction such that the sum of X-ray diffraction intensities at lattice spacings d=1.15±0.03 nm and d=0.397±0.01 nm, is at least 90% of the diffraction intensity at d=0.346±0.01 nm of Catalysis Society reference catalyst JRC-Z-HM-20(3).

The present invention also provides a method for adsorbing and removing a hydrocarbon in a gas phase, which comprises contacting such an adsorbent for a hydrocarbon, with the gas phase.

Further, the present invention provides an exhaust gas-purifying catalyst comprising such an adsorbent for a hydrocarbon and a nitrogen oxide-removing catalyst having an active metal contained in a porous material support.

Still further, the present invention provides a method for purifying an exhaust gas, which comprises contacting such an exhaust gas-purifying catalyst with the exhaust gas.

Now, the present invention will be described in detail with reference to the preferred embodiments.

It is essential that the adsorbent for a hydrocarbon of the present invention comprises a β-type zeolite. The β-type zeolite has a composition represented by the formula:

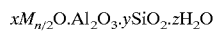

wherein n is an atomic valence of cation M, x is a number within a range of from 0 to 2.5, y is a number of at least 1, and z is a number of at least 0. The structure is disclosed in ZEOLITES, 12(5) 58–59 (1992) and JP-A-5-201722, and it is known as a zeolite having 12-membered ring pores and having a crystal structure represented by the X-ray diffraction as shown in Table 1.

TABLE 1

| Lattice spacings (d: nm) | Relative intensity |
|---|---|
| 1.15 ± 0.03 | Fairly strong |
| 0.74 ± 0.02 | Weak |
| 0.66 ± 0.015 | Weak |
| 0.415 ± 0.01 | Weak |
| 0.397 ± 0.01 | Very strong |
| 0.3 ± 0.007 | Weak |
| 0.205 ± 0.005 | Weak |

The β-type zeolite constituting the adsorbent of the present invention is required to have a crystallinity such that the sum of X-ray diffraction intensities at lattice spacings d=1.15±0.03 nm and d=0.397±0.01 nm in the powder X-ray diffraction, is at least 90% of the diffraction intensity at d=0.346±0.01 nm of Catalysis Society reference catalyst JRC-Z-HM-20(3), in a state after calcination to remove an organic compound incorporated during the preparation of the zeolite. The crystallinity of a zeolite can usually be evaluated by X-ray diffraction. In general, the crystallinity by X-ray diffraction can be evaluated by the peak intensity (height) of a detected diffraction peak and the peak area. When the crystallinity of zeolite is high, the detection intensities of diffraction peaks attributable to the zeolite are high, and when the crystallinity is low in a case where impurities such as amorphous components are co-existent, the diffraction peaks tend to be small. Namely, the β-type zeolite of the present invention contains substantially no impurities such as amorphous components and has high crystallinity, whereby the adsorption capacity increases, and the thermal resistance is improved.

The $SiO_2/Al_2O_3$ molar ratio of the β-type zeolite is not particularly limited, but it is preferably from 10 to 1000, more preferably from 20 to 500, in order to increase the thermal resistance and the adsorption characteristics for a hydrocarbon.

Further, the crystal particle size of the β-type zeolite to be used in the present invention, is not particularly limited. However, in order to increase the thermal resistance, it is preferred that the average particle size is from 3 to 10 μm, and the zeolite has a particle size distribution such that particles of at least 1 μm constitutes at least 80%. The particle size of the zeolite can be measured by an analytical instrument such as an electron microscope or a Caulter counter, and it can be evaluated by a gauss-type distribution represented by the occupying proportion of particles with particle sizes within a described range, and the average particle size calculated from such a particle size distribution.

Now, a process for producing the β-type zeolite will be described. The β-type zeolite of the present invention may be one having the above described crystallinity, and the process for its production is not particularly limited. For example, it can be produced by a hydrothermal synthesis wherein an aqueous reaction slurry employing e.g. tetraethylammonium as a template agent as disclosed in JP-A-5-201722, is used as a starting material, and the starting material is heated for crystallization. It is further preferred to employ a process as disclosed in JP-A-9-175818 in which a powdery starting material composition dried at a temperature of at least 50° C., is contacted with steam spontaneously generated at a temperature of from 80 to 200° C., without directly contacting it with water of a liquid phase, whereby a β-type zeolite having higher crystallinity can be obtained.

In the preparation of a β-type zeolite as disclosed in JP-A-9-175818, the starting material composition comprises an alumina source, a silica source, an alkali source and tetraethylammonium ions. As the alumina source, aluminum sulfate, sodium aluminate, aluminum hydroxide or aluminosilicate gel may, for example, be used, and as the silica source, colloidal silica, amorphous silica, sodium silicate or aluminosilicate gel may, for example, be used. Preferred is one in the form whereby it can adequately uniformly be mixed with other components.

As the alkali source, an alkali component in sodium hydroxide, sodium aluminate or sodium silicate, or an alkali component in an aluminosilicate gel, may, for example, be preferably employed. Further, potassium hydroxide or potassium aluminate may, for example, be used. For the tetraethylammonium ions, it is usual to employ tetraethylammonium hydroxide.

These materials are sufficiently mixed in the presence of water to obtain a uniform slurry. The amount of water used here is not particularly limited. Then, this uniform slurry is dried at a temperature of at least 50° C. to obtain a powdery starting material composition. The upper limit for the drying temperature is not particularly limited, but it is preferably within a temperature range in which water does not boil. The drying is uniformly carried out until the equilibrium water content is reached at that temperature. If the drying temperature is lower than 50° C., the water content of the powdery starting material composition tends to be high, whereby the crystallinity tends to be low. The method for drying the uniform slurry is not particularly limited, but it is preferred to dry the aqueous slurry of the starting material mixture with stirring.

The chemical composition of the powdery starting material composition thereby obtained, is represented by the following molar ratios of oxides:
$SiO_2/Al_2O_3$=10 to 1000
$M_2O/SiO_2$=0 to 0.4
$TEA_2O/SiO_2$=0.1 to 1.0
wherein M is an alkali metal, and TEA is tetraethylammonium, preferably:
$SiO_2/Al_2O_3$=20 to 600
$M_2O/SiO_2$=0 to 0.1
$TEA_2O/SiO_2$=0.15 to 0.25

This powdery starting material composition is put into a sealed container and crystallized by contacting it with steam spontaneously formed at a predetermined temperature, without directly contacting it with water of a liquid phase.

The crystallizing temperature is preferably within a range of from 80 to 200° C. If it is lower than 80° C., the crystallization speed is very slow, and it takes a long time for crystallization, such being economically disadvantageous. On the other hand, if the temperature is higher than 200° C., decomposition of tetraethylammonium ions tends to be vigorous, whereby it tends to be difficult to obtain a β-type zeolite having high crystallinity.

The β-type zeolite produced by the above described process is used as a calcined product. Calcination of the synthesized zeolite is carried out to remove tetraethylammonium ions contained in the zeolite during the synthesis, and it is carried out under a condition hereby tetraethylammonium ions are sufficiently removed. n general, the calcination is carried out at a temperature of from 550 to 1000° C. for a calcination time of from 0.5 to 10 hours. The calcination atmosphere may be air, nitrogen, or air or nitrogen containing an oxidative gas. Ions such as Na in the β-type zeolite may be treated with an ammonium salt or a mineral acid, so that the zeolite can be used in the H-type or the $NH_4$-type.

The adsorbent of the present invention may be one having a transition metal contained in the above P-type zeolite, whereby the performance for adsorbing a hydrocarbon can be further improved. When a transition metal is to be incorporated, the transition metal is not particularly limited and may, for example, be an element of Group IIIa, IVa, VIa, VIIa, VIII, Ib or IIb of the Periodic Table. At least one of these transition metals may be incorporated. As the transition metal, Cu and/or Ag is preferred. The method for incorporating the transition metal is not particularly limited, and any conventional method may suitably be employed. For example, it is possible to employ an ion exchange method, an impregnation-supporting method, an evaporation-to-dryness method, a dipping method or a solid phase exchange method. The salt to be used for incorporating the transition metal is not particularly limited, and a salt such as a nitrate, a sulfate, an acetate, an oxalate or an ammine complex salt, may, for example, be used. If more than one transition metal is to be incorporated, such transition metals may sequentially be incorporated, or may simultaneously be incorporated.

The content of the transition metal contained in the adsorbent prepared by the above process, is preferably within a range of from 0.1 to 20 wt %, more preferably from 0.2 to 10 wt %, based on the total amount of the transition metal and the β-type zeolite, in order to obtain an adequate performance for adsorbing a hydrocarbon.

As described in the foregoing, the adsorbent for a hydrocarbon of the present invention can be produced.

The adsorbent of the present invention can be used as mixed and molded with a binder such as silica, alumina or a clay mineral. The clay mineral to be used at the time of molding, may, for example, be a clay mineral such as kaolin, attapulgite, montmorillonite, bentonite, allophane or sepiolite. Further, the adsorbent for a hydrocarbon of the present invention may be used as wash-coated on a honeycomb substrate made of cordierite or metal.

Adsorption and removal of a hydrocarbon in a gas phase, can be carried out by contacting the adsorbent of the present invention with the gas phase. This gas phase is not particularly limited, and the present invention can be applied, for example, to a gas phase containing a hydrocarbon, such as the atmosphere or an exhaust gas. Further, the present invention is effective also in a case where the gas phase contains carbon monoxide, carbon dioxide, hydrogen, oxygen, nitrogen, nitrogen oxide, sulfur oxide or water in addition to the hydrocarbon.

The types of hydrocarbons to be adsorbed by the adsorbent include, for example, unsaturated hydrocarbons (olefins) such as ethylene, propylene, butene and 1-hexadecene, saturated hydrocarbons (paraffins) such as methane, ethane, propane, n-decane and n-hexadecane, aromatic hydrocarbons such as benzene, toluene, naphthalene and anthracene, and branched hydrocarbons such as 2-methylpropane and isopropylbenzene. Further, as derivatives of the above hydrocarbons, oxygen-containing organic compounds such as ketones and aldehydes, and nitrogen-containing organic compounds such as amines, may also be adsorbed. Namely, the gas phase to be treated by the adsorbent of the present invention is one containing at least one type of these hydrocarbons. The hydrocarbon to be adsorbed, is preferably a straight chain paraffin having at least 7 carbon atoms, a straight chain olefin having at least 7 carbon atoms and/or a polycyclic aromatic compound, more preferably a straight chain paraffin having from 10 to 18 carbon atoms, or a straight chain olefin having from 10 to 18 carbons atoms.

The concentration of the hydrocarbon in the gas phase is not particularly limited, but it is preferably from 0.001 to 5 vol %, more preferably from 0.005 to 3 vol %, as calculated as methane. The concentrations of various components other than the hydrocarbon are also not particularly limited, and, for example, CO=0 to 1 vol %, $CO_2$=0 to 10 vol %, $O_2$=0 to 20 vol %, nitrogen oxide=0 to 10 vol %, sulfur oxide=0 to 0.05 vol %, and $H_2O$=0 to 15 vol %.

The space velocity and the temperature at the time of adsorbing and removing the hydrocarbon, are not particularly limited. However, the space velocity is preferably from 100 to 500,000 $hr^{-1}$, and the temperature is preferably from −30 to 250° C.

The exhaust gas-purifying catalyst of the present invention comprises the adsorbent component for a hydrocarbon of the present invention and a catalyst component for removing nitrogen oxide.

Now, the catalyst for removing nitrogen oxide, constituting the exhaust gas-purifying catalyst of the present invention, will be described.

The nitrogen oxide-removing catalyst of the present invention is a catalyst having an activity to remove nitrogen oxide and having an active metal contained in a porous material, preferably one showing the activity also under an oxygen excessive exhaust gas. A catalyst is preferred which has at least one noble metal selected from Pt, Pd, Ir and Rh incorporated as the active metal on a porous material, and the average particle size of the noble metal is preferably at least 10 nm. If the average particle size of the noble metal is at least 10 nm, the hydrocarbon in the exhaust gas and the hydrocarbon supplied from the adsorbent, can effectively be utilized, and the nitrogen oxide removal activity can be improved. The reason for such improvement is not clearly understood. However, it is believed that the activity for reducing and removing nitrogen oxide by the hydrocarbon can be increased by a proper balance of the reaction for reducing and removing nitrogen oxide and a reaction for complete combustion of the hydrocarbon, or by formation of special active sites. Further, it is considered that when the size of noble metal particles is at least 10 nm, the noble metal particles are stabilized, whereby the thermal stability will be improved. As the noble metal, Pt is preferably employed from the viewpoint of the activity and the thermal stability.

The porous material is not particularly limited. For example, an oxide such as alumina, silica, zirconia or titania, a composite oxide such as silica-alumina, silica-zirconia or silica-titania, or zeolite, may be used. Among them, alumina or zeolite is preferred from the viewpoint of the activity and durability.

The method for incorporating the transition metal to the porous material is not particularly limited, and it is possible to employ a conventional method such as an impregnation-supporting method, an evaporation-to-dryness method, a physical mixing method or an ion exchange method. The compound to be used for incorporating the active metal is also not particularly limited, and a nitrate, a sulfate, a chloride or an ammine complex salt, may, for example, be used. The amount of the active metal incorporated to the porous material, is not particularly limited, but it is preferably at least 0.5 wt %, relative to the porous material, in order to obtain an adequate nitrogen oxide removal activity. Further, the noble metal is preferably at most 10 wt %, relative to the porous material from the viewpoint of the production cost, so long as the effect corresponding to the incorporated amount is obtainable.

The porous material having the active metal incorporated, is preferably subjected to thermal treatment to stabilize the active metal. To stabilize the active metal with a particle size of 10 nm, it is preferably treated at a temperature of from 400 to 900° C. The atmosphere for the thermal treatment is not particularly limited, and treatment can be carried out in air, nitrogen, hydrogen or a gas containing hydrogen.

As described in the foregoing, the nitrogen oxide-removing catalyst of the present invention can be produced.

The hydrocarbon adsorbent and the nitrogen oxide-removing catalyst constituting the exhaust gas-purifying catalyst of the present invention, can be used as mixed and molded with a binder such as silica, alumina or a clay mineral. The clay mineral to be used at the time of the molding, may, for example, be a clay mineral such as kaolin, attapulgite, montmorillonite, bentonite, allophane or sepiolite. Further, the hydrocarbon adsorbent of the present invention and the nitrogen oxide-removing catalyst may be used as wash-coated on a honeycomb substrate made of cordierite or metal.

The manner of combining the two components to prepare the exhaust gas-purifying catalyst is not particularly limited. However, in order to have the hydrocarbon adsorbed on the β-type zeolite and to utilize the hydrocarbon desorbing from the adsorbent effectively for the nitrogen oxide removal reaction, it is preferred that the hydrocarbon desorbing from the β-type zeolite is supplied efficiently to the nitrogen oxide-removing catalyst, and the temperature for desorption of the hydrocarbon agrees to the operation temperature of the nitrogen oxide-removing catalyst. To obtain such a state, the nitrogen oxide-removing catalyst may be selected to meet with the temperature for desorption of the hydrocarbon from the β-type zeolite. However, such an effect can also be obtained by properly adjusting the positions. For example, when the catalyst of the present invention is used as washcoated on a molded product or on a honeycomb substrate, it is possible to employ a method wherein the β-type zeolite is disposed at the upstream side of the exhaust gas, and the nitrogen oxide-removing catalyst is disposed at the downstream side thereof, a method wherein the β-type zeolite layer and the nitrogen-oxide-removing catalyst layer may be used as laminated to each other, or a method wherein the β-type zeolite and the nitrogen oxide-removing catalyst are employed in admixture in the form of powders or molded products.

As described in the foregoing, the exhaust gas-purifying catalyst of the present invention can be produced by combining the hydrocarbon adsorbent and the nitrogen oxide-removing catalyst.

Removal of the nitrogen oxide from an exhaust gas can be carried out by contacting the above exhaust gas-purifying catalyst with the exhaust gas, and this is effective also for an oxygen excessive exhaust gas. The exhaust gas contains nitrogen oxide and hydrocarbons. Here, the oxygen excessive exhaust gas is meant for an exhaust gas which contains oxygen in excess of the amount of oxygen required to completely oxidize the hydrocarbons, hydrogen and carbon monoxide contained in the exhaust gas. Such an exhaust gas may, for example, be an exhaust gas discharged from an internal combustion engine such as a diesel engine, particularly an exhaust gas from combustion in a large air/fuel ratio. Further, the above exhaust gas may contain hydrocarbons, carbon monoxide, carbon dioxide, hydrogen, sulfur-oxide and water.

The types of hydrocarbons contained in the exhaust gas to be treated by the present invention, are not particularly limited and include, for example, paraffins, olefins, aromatic compounds and their mixtures. Specifically, as the paraffins and olefins, hydrocarbons having from 10 to 20 carbon atoms, may be used, and as the aromatic compounds, benzene, naphthalene and their derivatives may be used. Further, two or more hydrocarbons selected from the above olefins, paraffins and aromatic compounds, may be used as mixed, and light oil, kerosene or gasoline may also be used. The concentrations of the respective components in the exhaust gas are not particularly limited, but they are usually preferably such that nitrogen oxide is from 50 to 2,000 ppm, hydrocarbons are from 10 to 10,000 ppmC (based on carbon), and oxygen is from 0.1 to 20%. Further, the above mentioned suitable hydrocarbon may be incorporated to the exhaust gas, in order to further increase the nitrogen oxide-removing activity.

The space velocity and the temperature of the exhaust gas to be treated, are not particularly limited. However, preferably, the space velocity (based on the volume) is from 500 to 500,000 hr$^{-1}$, and the temperature is from 100 to 800° C. More preferably, the space velocity is from 2000 to 300,000 hr$^{-1}$, and the temperature is from 100 to 600° C.

Now, the present invention will be described in further detail with reference to the Examples. However, it should be understood that the present invention is by no means restricted to such specific Examples.

EXAMPLE 1

Preparation of Exhaust Gas-Durifying Catalyst 1

β-type zeolite manufactured by TOSOH CORPORATION (tradename: HSZ-93ONHA) having a $SiO_2/Al_2O_3$ molar ratio of 26, was calcined at 600° C. for 2 hours in an air stream to remove tetraethylammonium ions contained in the β-type zeolite. Then, 20 g of the calcined β-type zeolite was added to an aqueous ammonium chloride solution having 5.6 g of $HN_4Cl$ dissolved in 180 g of pure water, whereupon an ion exchange operation was carried out at 60° C. for 20 hours. This ion exchange operation was repeated twice, followed by solid-liquid separation. The product was washed with pure water until Cl ions were no longer detected, followed by drying at 110 ° C. for 20 hours to obtain hydrocarbon adsorbent 1. The chemical composition of hydrocarbon adsorbent 1 was analyzed by an ICP emission analysis, whereby it had a composition of $0.01Na_2O.Al_2O_3 \cdot 26.1SiO_2$, based on anhydrous oxide.

Further, the crystallinity of hydrocarbon adsorbent 1 was evaluated by powder X-ray diffraction (CuKα), whereby the sum of the diffraction intensities at d=1.15 and d=0.396 of hydrocarbon adsorbent 1, was 95% of the diffraction intensity at d=0.346 of Catalysis Society reference catalyst JRC-Z-HM-20(3).

0.31 g of tetraammine dichloroplatinum was impregnated and supported on 10 g of alumina manufactured by Shokubai Kasei K.K. (Tradename: ACP-1), followed by drying at 110° C. for 20 hours. Then, the product was calcined at 800° C. for one hour in an air stream to obtain nitrogen oxide-removing catalyst 1. From the chemical composition analysis, the Pt content of nitrogen oxide-removing catalyst 1 was 1.7 wt %. This nitrogen oxide-removing catalyst 1 was evaluated by powder X-ray diffraction (CuKα), whereby the average particle size of Pt particles calculated from the Scherrer formula, was 18 nm.

3 g of hydrocarbon adsorbent 1 and 3 g of nitrogen oxide-removing catalyst 1 were mixed in a mortar, press-molded and then pulverized to a particle size of from 12 to 20 mesh to obtain exhaust gas-purifying catalyst 1.

EXAMPLE 2

Preparation of Exhaust Gas-purifying Catalyst 2

10 g of mordenite manufactured by TOSOH CORPORATION (tradename: HSZ-690HOA) having a $SiO_2/Al_2O_3$ molar ratio of 224, was added to 100 mL of an aqueous solution containing 0.29 g of tetraammine dichloroplatinum, and then the pH was adjusted to 7 with aqueous ammonia. The mixture was stirred at 30° C. for two hours, then subjected to filtration, washing and further drying at 110° C. for 20 hours. Then, the dried product was calcined at 500° C. for one hour in an air stream to obtain nitrogen oxide-removing catalyst 2. From the analysis of the chemical composition, the Pt content in nitrogen oxide-removing catalyst 2 was 1.7 wt %.

This nitrogen oxide-removing catalyst 2 was evaluated by powder X-ray diffraction (CuKα), whereby the average particle size of Pt particles calculated from the Scherrer formula was 19 nm.

3 g of hydrocarbon adsorbent 1 obtained in Example 1 and 3 g of nitrogen oxide-removing catalyst 2 were mixed in a mortar, press-molded and then pulverized to a particle size of from 12 to 20 mesh to obtain exhaust gas-purifying catalyst 2.

EXAMPLE 3

Preparation of Exhaust Gas-purifying Catalyst 3

0.9 mL of a 4M sodium hydroxide aqueous solution and 13.6 g of aqueous solution containing tetraethylammonium hydroxide (concentration: 20%) were added to 10 g of colloidal silica ($SiO_2$: 30 wt %) with stirring. Then, to this mixed slurry, an aqueous solution containing 0.34 g of aluminum sulfate dissolved in 10 mL of water, was added. This aqueous starting material mixture was stirred for one hour, and then while maintaining the temperature at 80° C., it was stirred and dried until the water content reached an equilibrium amount, to obtain a starting material composition. The chemical composition of this starting material composition was $1.80Na_2O.Al_2O_3.50.1SiO_2.9.3TEA_2O$, as calculated as anhydrous product.

This starting material composition was pulverized to obtain a powdery starting material composition. The obtained powdery composition was placed on a substrate plate in a sealed container so that it did not contact with water in a liquid phase, and water was introduced into the bottom of the container, followed by heating at 180° C. for 120 hours. The product was washed with pure water and then dried at 80° C. The product was examined by X-ray diffraction employing CuKα as the ray source, whereby it was confirmed to be a β-type zeolite.

This β-type zeolite was calcined at 600° C. for two hours in an air stream to remove tetraethylammonium hydroxide. Then, 20 g of the β-type zeolite was added to an aqueous ammonium chloride solution having 5.6 g of $NH_4Cl$ dissolved in 180 g of pure water, whereupon an ion exchange operation was carried out at 60° C. for 20 hours. This ion exchange operation was repeated twice, followed by solid-liquid separation. The product was washed with water until Cl ions were no longer detected and dried at 110° C. for 20 hours to obtain hydrocarbon adsorbent 2. The chemical composition of hydrocarbon adsorbent 2 was analyzed by an ICP emission analysis, whereby it had a composition of $0.01Na_2O.Al_2O_3.51.1SiO_2$, as calculated as anhydrous product.

Further, the crystallinity of hydrocarbon adsorbent 2 was evaluated by powder X-ray diffraction (CuKα), whereby the sum of diffraction intensities at d=1.15 and d=0.394, was 124% of the diffraction intensity at d=0.346 of Catalysis Society reference catalyst JRC-Z-HM-20(3).

3 g of hydrocarbon adsorbent 2 and 3 g of nitrogen oxide-removing catalyst 1 were mixed in a mortar, press-molded and then pulverized to a particle size of from 12 to 20 mesh, to obtain exhaust gas-purifying catalyst 3.

EXAMPLE 4

Preparation of Exhaust Gas-purifying Catalyst 4

Hydrocarbon adsorbent 1 and nitrogen oxide-removing catalyst 1 obtained in Example 1 were, respectively, press-molded and pulverized to a particle size of from 12 to 20 mesh, and using 1 cc of each of them, they were disposed in an atmosphere pressure fixed bed flow reactor so that hydrocarbon adsorbent 1 was located at the reaction gas inlet side, and nitrogen oxide-removing catalyst 1 was located at the reaction gas outlet side, and used as exhaust gas-purifying catalyst 4.

COMPARATIVE EXAMPLE 1

Preparation of Comparative Catalyst 1

Comparative catalyst 1 was prepared in the same manner as in Example 2 except that mordenite manufactured by TOSOH CORPORATION (tradename: HSZ-660HOA) having a $SiO_2/Al_2O_3$ molar ratio of 26, was used instead of the β-type zeolite.

COMPARATIVE EXAMPLE 2

Preparation of Comparative Catalyst 2

Comparative catalyst 2 was prepared in the same manner as in Example 2 except that Y-type zeolite manufactured by TOSOH CORPORATION (tradename: HSZ-370HOA) having a $SiO_2/Al_2O_3$ molar ratio of 29, was used instead of the β-type zeolite.

COMPARATIVE EXAMPLE 3

Preparation of Comparative Catalyst 3

Comparative catalyst 3 was prepared in the same manner as in Example 2 except that ZSM-5 manufactured by TOSOH CORPORATION (tradename: HSZ-890HOA) having a $SiO_2/Al_2O_3$ molar ratio of 2100, was used instead of the β-type zeolite.

COMPARATIVE EXAMPLE 4

Preparation of Comparative Catalyst 4

Using the same materials as for hydrocarbon adsorbent 2 in Example 3, an aqueous starting material composition having a composition of $3.09Na_2O.Al_2O_3.31SiO_2.1.71TEA_{2O}.465H_2O$, was prepared.

600 mL of this aqueous starting material slurry was put into an autoclave having a capacity of 1 L, and after adding β-type zeolite corresponding to 1 wt % of the aqueous starting material, as seed crystals, hydrothermal synthesis was carried out at 150° C. for 72 hours with stirring. The product was washed with pure water and dried, and then it was examined by powder X-ray diffraction employing CuKα as a ray source, whereby it was confirmed to be a β-type zeolite.

The obtained β-type zeolite was calcined in the same air stream as in Example 3, followed by ion exchange in an aqueous ammonium chloride solution, washing with pure water and drying to obtain comparative adsorbent 1. The chemical composition of comparative adsorbent 1 was analyzed by an ICP emission analysis, whereby it had a composition of $0.01Na_2O.Al_2O_3.21.4SiO_2$ based on oxide as calculated as anhydrous product.

Further, the crystallinity of comparative adsorbent 1 was evaluated by powder X-ray diffraction (CuKα), whereby the sum of diffraction intensities at d=1.15 and d=0.397 of comparative adsorbent 1, was 87% of the diffraction intensity at d=0.346 of Catalysis Society reference catalyst JRC-Z-HM-20(3).

Comparative catalyst 4 was prepared in the same manner as in Example 2 except that comparative adsorbent 1 was used instead of hydrocarbon adsorbent 1.

COMPARATIVE EXAMPLE 5

Preparation of Comparative Catalyst 5

Nitrogen oxide-removing catalyst 1 obtained in Example 1, was press-molded and then pulverized to a particle size of from 12 to 20 mesh, to obtain comparative catalyst 5.

COMPARATIVE EXAMPLE 6

Preparation of Comparative Catalyst 6

β-type zeolite manufactured by TOSOH CORPORATION (tradename: HSZ-930NHA) having a $SiO_2/Al_2O_3$ molar ratio of 26, was calcined and subjected to ion exchange in an aqueous ammonium chloride solution in the same manner as in Example 1 to obtain an ammonium-exchanged β-type zeolite. 10 g of the ammonium-exchanged β-type zeolite was added to 100 mL of an aqueous solution containing 0.29 g of tetraammine dichloroplatinum , and then the pH was adjusted to 7 with aqueous ammonia, followed by stirring at 30° C. for two hours. Then, filtration and washing were carried out, and the product was further dried at 110° C. for 20 hours. Then, it was calcined at 500° C. for one hour in an air stream to obtain a Pt-containing β-type zeolite. From the chemical composition analysis, the Pt content was 1.7 wt %. Further, the Pt-containing β-type zeolite was evaluated by powder X-ray diffraction (CuKα), whereby the average particle size of Pt particles calculated by the Scherrer formula, was 9 nm.

The Pt-containing β-type zeolite was press-molded and then pulverized to a particle size of from 12 to 20 mesh to obtain comparative catalyst 6.

Test on Catalytic Activity 2 cc each of exhaust gas-purifying catalysts 1 to 4 and comparative catalysts 1 to 6 was packed into an atmospheric pressure fixed bed flow reactor and evaluated. Pre-treatment was carried out at 550° C. for 30 minutes by supplying a gas having a composition as shown in Table 2 simulating an exhaust gas of a diesel engine at a rate of 4 L/min. Then, the temperature was lowered to 100° C. and maintained for one hour. Then, while raising the temperature at a rate of 10° C./min to 500° C., the nitrogen oxide removal activity was measured. The $NO_x$ conversion efficiency at various temperatures are shown in Table 3. The $NO_x$ conversion efficiency is represented by the following formula:

$$X_{NOx} = \{([NO_x]_{in} - [NO_x]_{out}) / [NO_x]_{in}\} \times 100$$

wherein $X_{NOx}$: $NO_x$ conversion efficiency $[NO_x]_{in}$: $NO_x$ concentration in the inlet gas $[NO_x]_{out}$: $NO_x$ concentration in the outlet gas.

TABLE 2

| Gas composition | Concentration |
|---|---|
| n-$C_{10}H_{22}$ | 1000 ppm C (based on carbon) |
| NO | 200 ppm |
| $O_2$ | 10% |
| $SO_2$ | 25 ppm |
| $H_2O$ | 7% |
| $N_2$ | Balance |

TABLE 3

| | $NO_x$ conversion efficiency (%) | | |
|---|---|---|---|
| | 200° C. | 250° C. | 300° C. |
| Exhaust gas-purifying catalyst 1 | 64 | 47 | 29 |
| Exhaust gas-purifying catalyst 2 | 56 | 41 | 26 |
| Exhaust gas-purifying catalyst 3 | 69 | 51 | 31 |
| Exhaust gas-purifying catalyst 4 | 52 | 53 | 22 |
| Comparative catalyst 1 | 38 | 40 | 20 |
| Comparative catalyst 2 | 28 | 25 | 11 |
| Comparative catalyst 3 | 29 | 21 | 7 |
| Comparative catalyst 4 | 27 | 39 | 24 |
| Comparative catalyst 5 | 34 | 26 | 8 |
| Comparative catalyst 6 | 40 | 35 | 20 |

Test on Durability of Catalyst

Durability tests were carried out with respect to exhaust gas-purifying catalysts 1 to 4 and comparative catalysts 1 to 6. The durability treatment was carried out by packing 2 cc of each catalyst into an atmospheric pressure fixed bed flow reactor and flowing an air containing 25 ppm of $SO_2$ and 10 vol % of $H_2O$ at a rate of 200 mL/min at 600° C. for 50 hours. With respect to each catalyst subjected to the durability treatment, the $NO_x$ removal rate was measured under the same conditions as in "Test on catalytic activity". The $NO_x$ conversion efficiency at various temperatures are shown in Table 4.

TABLE 4

| | $NO_x$ conversion efficiency (%) | | |
|---|---|---|---|
| | 200° C. | 250° C. | 300° C. |
| Exhaust gas-purifying catalyst 1 | 60 | 42 | 22 |
| Exhaust gas-purifying catalyst 2 | 51 | 38 | 20 |
| Exhaust gas-purifying catalyst 3 | 65 | 44 | 27 |
| Exhaust gas-purifying catalyst 4 | 47 | 48 | 21 |
| Comparative catalyst 1 | 30 | 35 | 5 |
| Comparative catalyst 2 | 24 | 22 | 10 |
| Comparative catalyst 3 | 25 | 21 | 12 |
| Comparative catalyst 4 | 32 | 34 | 18 |
| Comparative catalyst 5 | 29 | 24 | 19 |
| Comparative catalyst 6 | 39 | 33 | 17 |

It is evident from Tables 3 and 4 that the exhaust gas-purifying catalysts of the present invention exhibit high nitrogen oxide-removing activities, and the nitrogen oxide-removing activities are high even after the catalysts were exposed to a high temperature. Namely, by using the catalysts of the present invention, nitrogen oxide can be removed efficiently from an exhaust gas.

EXAMPLE 5

Preparation of Hydrocarbon Adsorbent 3

Using the same materials as in Example 3, an aqueous starting material mixture was prepared, followed by stirring at 80° C., drying and pulverization, to obtain a powdery starting material composition having a composition of $5.00Na_2O.Al_2O_3.100SiO_2.18.5TEA_2O$.

This composition was heated at 180° C. for 72 hours in the same manner as in Example 3. The product was washed with pure water and dried, and then it was examined by X-ray diffraction employing CuKα, whereby it was confirmed to be a β-type zeolite.

The obtained β-type zeolite was subjected to calcination in an air stream, ion exchange in an aqueous ammonium chloride solution, washing with pure water and drying, in the same manner as in Example 3, to obtain hydrocarbon adsorbent 3. The chemical composition of hydrocarbon adsorbent 3 was analyzed by an ICP emission analysis, whereby it had a composition of $0.01Na_2O.Al_2O_3.84.2SiO_2$, as calculated as anhydrous product.

The crystallinity of hydrocarbon adsorbent 3 was evaluated by X-ray diffraction (CuKα), whereby the sum of diffraction intensities at d=1.14 and d=0.393 of hydrocarbon adsorbent 3, was 99% of the diffraction intensity at d=0.346 of Catalysis Society reference catalyst JRC-Z-HM-20(3).

EXAMPLE 6

Preparation of Hydrocarbon Adsorbent 4

Using the same materials as in Example 3, an aqueous starting material mixture was prepared, followed by stirring at 80° C., drying and pulverization to obtain a powdery starting material composition having a composition of $12.9Na_2O.Al_2O_3.400SiO_2.75.8TEA_2O$.

This composition was heated at 180° C. for 72 hours in the same manner as in Example 3. The product was washed with pure water and dried, whereupon it was examined by X-ray diffraction employing CuKα, whereby it was confirmed to be a β-type zeolite.

The obtained β-type zeolite was subjected to calcination in an air stream, ion exchange in an aqueous ammonium chloride solution, washing with pure water and drying, in the same manner as in Example 3, to obtain hydrocarbon adsorbent 4. The chemical composition of hydrocarbon adsorbent 4 was analyzed by an ICP emission analysis, whereby it had a composition of $0.01Na_2O.Al_2O_3.204SiO_2$, as calculated as anhydrous product.

The crystallinity of hydrocarbon adsorbent 4 was evaluated by X-ray diffraction (CuKα), whereby the sum of diffraction intensities at d=1.14 and d=0.395 of hydrocarbon adsorbent 4, was 92% of the diffraction intensity at d=0.346 of Catalysis Society reference catalyst JRC-Z-HM-20(3).

EXAMPLE 7

Preparation of Hydrocarbon Adsorbent 5

10 g of hydrocarbon adsorbent 1 was added to an aqueous copper acetate solution having 1.20 g of copper acetate monohydrate dissolved in 100 g of pure water, and an ion exchange operation was carried out at 30° C. for 20 hours. Then, solid-liquid separation was carried out, and the product was washed with pure water and dried at 110C for 20 hours to obtain hydrocarbon adsorbent 5. The chemical composition of hydrocarbon adsorbent 5 was analyzed by an ICP emission analysis, whereby it had a composition of $0.48Cu.Al_2O_3.26SiO_2$, as calculated as anhydrous product, and the Cu content was 1.8 wt %. The crystallinity of hydrocarbon adsorbent 5 was evaluated by X-ray diffraction (CuKα), whereby the sum of diffraction intensities at d=1.15 and d=0.396 of hydrocarbon adsorbent 5, was 95% of the diffraction intensity at d=0.346 of Catalysis Society reference catalyst JRC-Z-HM-20(3).

EXAMPLE 8

Preparation of Hydrocarbon Adsorbent 6

Using 10 g of hydrocarbon adsorbent 2, the same ion exchange operation as in Example 7 was carried out to incorporate Cu, to obtain hydrocarbon adsorbent 6. The chemical composition of hydrocarbon adsorbent 6 was analyzed by an ICP emission analysis, whereby it had a composition of $0.95Cu.Al_2O_3.51.1SiO_2$, as calculated as an anhydrous product, and the Cu content was 1.9 wt %. The crystallinity of hydrocarbon adsorbent 6 was evaluated by X-ray diffraction (CuKα), whereby the sum of diffraction intensities at d=1.15 and d=0.394 of hydrocarbon adsorbent 6, was 120% of the diffraction intensity at d=0.346 of Catalysis Society reference catalyst JRC-Z-HM-20(3).

EXAMPLE 9

Preparation of Hydrocarbon Adsorbent 7

Hydrocarbon adsorbent 7 was prepared in the same manner as in Example 7 except that 10 g of hydrocarbon adsorbent 1 was added to an aqueous copper acetate solution having 3.0 g of copper acetate monohydrate dissolved in 100 g of pure water, and a predetermined amount of a 7% ammonium aqueous solution was immediately added to adjust the pH to 10.5. The chemical composition of hydrocarbon adsorbent 7 was analyzed by an ICP emission analysis, whereby it had a composition of $2.05Cu.Al_2O_3.26SiO_2$, as calculated as anhydrous product, and the Cu content was 7.2 wt %. The crystallinity of hydrocarbon adsorbent 7 was evaluated by X-ray diffraction (CuKα), whereby the sum of diffraction intensities at d=1.15 and d=0.396 of hydrocarbon adsorbent 7, was 94% of the diffraction intensity at d=0.346 of Catalysis Society reference catalyst JRC-Z-HM-20(3).

EXAMPLE 10

Preparation of Hydrocarbon Adsorbent 8

Hydrocarbon adsorbent 8 was prepared in the same manner as in Example 7 except that 10 g of hydrocarbon adsorbent 1 was added to an aqueous silver nitrate solution having 0.84 g of silver nitrate dissolved in 100 g of pure water. The chemical composition of hydrocarbon adsorbent 8 was analyzed by an ICP emission analysis, whereby it had a composition of $0.34Ag.Al_2O_3.26SiO_2$, as calculated as anhydrous product, and the Ag content was 2.2 wt %. The crystallinity of hydrocarbon adsorbent 8 was evaluated by X-ray diffraction (CuKα), whereby the sum of diffraction intensities at d=1.15 and d=0.396 of hydrocarbon adsorbent 8, was 93% of the diffraction intensity at d=0.346 of Catalysis Society reference catalyst JRC-Z-HM-20(3).

EXAMPLE 11

Preparation of hydrocarbon adsorbent 9

Hydrocarbon adsorbent 9 was prepared in the same manner as in Example 7 except that 10 g of hydrocarbon adsorbent 1 was added to an aqueous silver nitrate solution having 4.09 g of silver nitrate dissolved in 100 g of pure water. The chemical composition of hydrocarbon adsorbent 9 was analyzed by an ICP emission analysis, whereby it had a composition of $1.48Ag.Al_2O_3.26SiO_2$, as calculated as anhydrous product, and the Ag content was 8.4 wt %. The crystallinity of hydrocarbon adsorbent 9 was evaluated by X-ray diffraction (CuKα), whereby the sum of diffraction intensities at d=1.15 and d=0.396 of hydrocarbon adsorbent 9, was 91% of the diffraction intensity at d=0.346 of Catalysis Society reference catalyst JRC-Z-HM-20(3).

EXAMPLE 12

Preparation of Hydrocarbon Adsorbent 10

Hydrocarbon adsorbent 10 was prepared in the same manner as in Example 7 except that 10 g of hydrocarbon adsorbent 1 was added to a mixed aqueous solution of copper acetate and silver nitrate having 1.20 g of copper acetate and 0.84 g of silver nitrate dissolved in 100 g of pure water. The chemical composition of hydrocarbon adsorbent 10 was analyzed by an ICP emission analysis, whereby it had a composition of $0.35Cu.0.31Ag.Al_2O_3.26SiO_2$, as calculated as anhydrous product, and the Cu and Ag contents were 1.3 wt % and 1.9 wt %, respectively. The crystallinity of hydrocarbon adsorbent 10 was evaluated by X-ray diffraction (CuKα), whereby the sum of diffraction intensities at d=1.15 and d=0.396 of hydrocarbon adsorbent 10, was 92% of the diffraction intensity at d=0.346 of Catalysis Society reference catalyst JRC-Z-HM-20(3).

COMPARATIVE EXAMPLE 7

Preparation of Comparative Adsorbent 2

40 g of zeolite having a mordenite structure manufactured by TOSOH CORPORATION (tradename: HSZ-690HOA) having a $SiO_2/Al_2O_3$ molar ratio of 224, was added to an aqueous ammonium chloride solution having 8.4 g of $NH_4Cl$ dissolved in 400 g of pure water, and an ion exchange operation was carried out at 60° C. for 20 hours. This ion exchange operation was repeated twice, followed by solid-liquid separation. The product was washed with pure water until Cl ions were no longer detected and dried at 110° C. for 20 hours, to obtain comparative adsorbent 2.

COMPARATIVE EXAMPLE 8

Preparation of comparative adsorbent 3

40 g of Y-type zeolite manufactured by TOSOH CORPORATION (tradename: HSZ-390HOA) having a $SiO_2/Al_2O_3$ molar ratio of 640, was added to an aqueous ammonium chloride solution having 8.4 g of $NH_4Cl$ dissolved in 400 g of pure water, and an ion exchange operation was carried out at 60° C. for 20 hours. This ion exchange operation was repeated twice, followed by solid-liquid separation. The product was washed with pure water until Cl ions were no longer detected and dried at 110° C. for 20 hours, to obtain comparative adsorbent 3.

COMPARATIVE EXAMPLE 9

Preparation of Comparative Adsorbent 4

Comparative adsorbent 4 was prepared in the same manner as in Example 7 except that 10 g of comparative adsorbent 1 was added to an aqueous copper acetate solution having 1.20 g of copper acetate dissolved in 100 g of pure water. The chemical composition of comparative adsorbent 4 was analyzed by an ICP emission analysis, whereby it had a composition of $0.37Cu.Al_2O_3.21.4SiO_2$, as calculated as anhydrous product, and the Cu content was 1.7 wt %. The crystallinity of comparative adsorbent 4 was evaluated by X-ray diffraction (CuKα), whereby the sum of diffraction intensities at d=1.15 and d=0.397 of comparative adsorbent 4, was 85% of the diffraction intensity at d=0.346 of Catalysis Society reference catalyst JRC-Z-HM-20(3).

COMPARATIVE EXAMPLE 10

Preparation of Comparative Adsorbent 5

Comparative adsorbent 5 was prepared in the same manner as in Example 7 except that 10 g of comparative adsorbent 1 was added to an aqueous silver nitrate solution having 0.84 g of silver nitrate dissolved in 100 g of pure water. The chemical composition of comparative adsorbent 5 was analyzed by an ICP emission analysis, whereby it had a composition of $0.3Ag.Al_2O_3.21.4SiO_2$, as calculated as anhydrous product, and the Ag content was 2.3 wt %. The crystallinity of comparative adsorbent 5 was evaluated by X-ray diffraction (CuKα), whereby the sum of diffraction intensities at d=1.15 and d=0.396 of comparative adsorbent 5, was 80% of the diffraction intensity at d=0.346 of Catalysis Society reference catalyst JRC-Z-HM-20(3).

COMPARATIVE EXAMPLE 11

Preparation of Comparative Adsorbent 6

40 g of ZSM-5 type zeolite manufactured by TOSOH CORPORATION (tradename: HSZ-820NAA) having a $SiO_2/Al_2O_3$ molar ratio of 24, was added to an aqueous ammonium chloride solution having 8.4 g of $NH_4Cl$ dissolved in 400 g of pure water, and an ion exchange operation was carried out at 60° C. for 20 hours. This ion exchange operation was repeated twice, followed by solid-liquid separation. The product was washed with pure water until Cl ions were no longer detected and dried at 110° C. for 20 hours. Except for using 10 g of this product, the same operation as in Example 7 was carried out to obtain comparative adsorbent 6 containing Cu. The chemical composition of comparative adsorbent 6 was analyzed by an ICP emission analysis, whereby it had a composition of $0.45Cu.Al_2O_3.24SiO_2$, as calculated as anhydrous product, and the Cu content was 1.8 wt %.

COMPARATIVE EXAMPLE 12

Preparation of Comparative Adsorbent 7

40 g of zeolite having a mordenite structure manufactured by TOSOH CORPORATION (tradename: HSZ-660HOA) having a $SiO_2/Al_2O_3$ molar ratio of 26, was added to an aqueous ammonium chloride solution having 8.4 g of $NH_4Cl$ dissolved in 400 g of pure water, and an ion exchange operation was carried out at 60° C. for 20 hours. This ion exchange operation was repeated twice, followed by solid-liquid separation. The product was washed with pure water until Cl ions were no longer detected, and dried at 110° C. for 20 hours. Except for using 10 g of this product, the same operation as in Example 7 was carried out to obtain comparative adsorbent 7 containing Cu. The chemical composition of comparative adsorbent 7 was analyzed by an ICP emission analysis, whereby it had a composition of $0.40Cu.Al_2O_3.26SiO_2$, as calculated as anhydrous product, and the Cu content was 1.5 wt %.

COMPARATIVE EXAMPLE 13

Preparation of Comparative Adsorbent 8

10 g of comparative adsorbent 3 was added to an aqueous copper acetate solution having 0.5 g of copper acetate monohydrate dissolved in 50 g of pure water, and an impregnation supporting operation was carried out under reduced pressure. Then, the product was dried at 110° C. for 20 hours to obtain comparative adsorbent 8. The chemical composition of comparative adsorbent 8 was analyzed by an ICP emission analysis, whereby it had a composition of $9.8Cu.Al_2O_3.640SiO_2$, as calculated as anhydrous product, and the Cu content was 1.8 wt %.

Test on Adsorption and Removal of a Hydrocarbon

Each of hydrocarbon adsorbents 1 to 10 and comparative adsorbents 1 to 8, was press-molded and pulverized to a size of from 12 to 20 mesh. 1 cc (about 0.5 g) of each pulverized adsorbent was packed into an atmospheric pressure fixed bed flow reactor made of quartz glass and subjected to a test on adsorption of a hydrocarbon. As pre-treatment, the adsorbent was heated to 500° C. at a temperature raising rate of 20° C./min and maintained at 500° C. for one hour, while flowing 2 L/min of air. After cooling to 100° C. and completely substituting $N_2$ gas, a model exhaust gas having a composition as identified in Table 5, was contacted to the adsorbent at 100° C. at a gas flow rate of 2 L/min, until adsorption saturation was reached. The space velocity (based on the volume) at that time was 120,000 $hr^{-1}$. After confirming that the adsorption of the hydrocarbon in the model exhaust gas to the adsorbent reached saturation, $N_2$ gas was again flowed to the adsorbent to completely remove the hydrocarbon remaining in the gas phase. Then, the adsorbent was heated at a rate of 10° C./min, while flowing $N_2$ gas at a flow rate of 2 L/min, whereby the hydrocarbon desorbing from the adsorbent was continuously quantitatively analyzed by a hydrocarbon meter equipped with a flame ionization detector (FID), and the hydrocarbon adsorption characteristics were evaluated. Table 6 shows the amount of hydrocarbon adsorbed and the desorption peak temperature.

TABLE 5

| Gas composition | Concentration |
| --- | --- |
| n-$C_{10}H_{22}$ | 1,000 ppm C (calculated as methane) |
| $N_2$ | Balance |

TABLE 6

| Adsorbent | Amount of hydrocarbon adsorbed [(mol/g (weight of adsorbent)] | Desorption peak temperature (° C.) |
| --- | --- | --- |
| Hydrocarbon adsorbent 1 | 6.02 × 10⁻⁴ | 185 |
| Hydrocarbon adsorbent 2 | 6.48 × 10⁻⁴ | 200 |
| Hydrocarbon adsorbent 3 | 6.12 ± 10⁻⁴ | 222 |
| Hydrocarbon adsorbent 4 | 5.76 × 10⁻⁴ | 225 |
| Hydrocarbon adsorbent 5 | 6.05 × 10⁻⁴ | 258 |
| Hydrocarbon adsorbent 6 | 6.63 × 10⁻⁴ | 272 |
| Hydrocarbon adsorbent 7 | 5.92 × 10⁻⁴ | 237 |
| Hydrocarbon adsorbent 8 | 6.03 × 10⁻⁴ | 233 |
| Hydrocarbon adsorbent 9 | 6.01 × 10⁻⁴ | 310 |
| Hydrocarbon adsorbent 10 | 6.07 × 10⁻⁴ | 285 |
| Comparative adsorbent 1 | 4.39 × 10⁻⁴ | 169 |
| Comparative adsorbent 2 | 2.23 × 10⁻⁴ | 210 |
| Comparative adsorbent 3 | 1.82 × 10⁻⁴ | 165 |
| Comparative adsorbent 4 | 4.42 × 10⁻⁴ | 223 |
| Comparative adsorbent 5 | 4.37 × 10⁻⁴ | 241 |
| Comparative adsorbent 6 | 4.21 × 10⁻⁴ | 196 |
| Comparative adsorbent 7 | 2.91 × 10⁻⁴ | 201 |
| Comparative adsorbent 8 | 0.25 × 10⁻⁴ | 175 |

Test on Durability of Adsorbents

Each of hydrocarbon adsorbents 1 to 10 and comparative adsorbents 1 to 8, was press-molded and then pulverized to adjust the particle size to from 12 to 20 mesh. 3 cc of each adsorbent having the particle size thus adjusted, was packed into an atmospheric pressure fixed bed flow reactor made of quartz glass and subjected to a durability test. The durability test was carried out under such conditions that the adsorbent was treated at 600° C. for 50 hours, while flowing to the adsorbent a mixed gas having $H_2O$ incorporated to air gas in an amount of 10 vol %, at a flow rate of 300 cc/min.

With respect to the adsorbent subjected to such durability treatment, the hydrocarbon adsorption characteristics were evaluated after the same pre-treatment under the same evaluation conditions as in "Test on adsorption and removal of a hydrocarbon". The hydrocarbon adsorption characteristics after the durability test are shown in Table 7.

TABLE 7

| Adsorbent | Amount of hydrocarbon adsorbed [(mol/g (weight of adsorbent)] | Desorption peak temperature (° C.) |
| --- | --- | --- |
| Hydrocarbon adsorbent 1 | 6.11 × 10⁻⁴ | 215 |
| Hydrocarbon adsorbent 2 | 5.54 × 10⁻⁴ | 235 |
| Hydrocarbon adsorbent 3 | 5.99 × 10⁻⁴ | 228 |
| Hydrocarbon adsorbent 4 | 5.83 × 10⁻⁴ | 230 |
| Hydrocarbon adsorbent 5 | 6.06 × 10⁻⁴ | 250 |

TABLE 7-continued

| Adsorbent | Amount of hydrocarbon adsorbed [(mol/g (weight of adsorbent)] | Desorption peak temperature (° C.) |
|---|---|---|
| Hydrocarbon adsorbent 6 | 6.70 × 10⁻⁴ | 269 |
| Hydrocarbon adsorbent 7 | 5.88 ± 10⁻⁴ | 216 |
| Hydrocarbon adsorbent 8 | 6.14 × 10⁻⁴ | 235 |
| Hydrocarbon adsorbent 9 | 6.09 × 10⁻⁴ | 281 |
| Hydrocarbon adsorbent 10 | 6.06 × 10⁻⁴ | 251 |
| Comparative adsorbent 1 | 4.24 × 10⁻⁴ | 195 |
| Comparative adsorbent 2 | 2.32 × 10⁻⁴ | 203 |
| Comparative adsorbent 3 | 0.18 × 10⁻⁴ | 160 |
| Comparative adsorbent 4 | 3.72 × 10⁻⁴ | 198 |
| Comparative adsorbent 5 | 3.59 × 10⁻⁴ | 220 |
| Comparative adsorbent 6 | 4.07 × 10⁻⁴ | 173 |
| Comparative adsorbent 7 | 2.11 × 10⁻⁴ | 182 |
| Comparative adsorbent 8 | 0.16 × 10⁻⁴ | 150 |

It is evident from Tables 6 and 7 that the hydrocarbon adsorbents of the present invention are capable of adsorbing a hydrocarbon in a large amount, as compared with adsorbents heretofore proposed. Further, with the adsorbents of the present invention, the temperature for desorption of a hydrocarbon is high, and the power for detention of the hydrocarbon as adsorbed is strong. Namely, they are capable of keeping the hydrocarbon as adsorbed until the temperature reaches a temperature range, within which an exhaust gas-purifying catalyst represented by a three way catalyst, operates, whereby efficient exhaust gas purification will be possible. Further, with the adsorbents of the present invention, little change is observed in the performance for adsorption of a hydrocarbon even after they are exposed to a high temperature, and the durability is improved over the conventional adsorbents. Namely, the hydrocarbon can efficiently be removed.

As described in the foregoing, with the adsorbent of the present invention, a hydrocarbon discharged from e.g. an internal combustion engine can efficiently be adsorbed and removed, and even after the adsorbent is exposed to a high temperature, the performance for adsorption and removal of a hydrocarbon remains to be high. Further, with the exhaust gas-purifying catalyst of the present invention, the nitrogen oxide-removing activity is high, and even after the catalyst is exposed to a high temperature, the activity for removing nitrogen oxide remains to be high.

What is claimed is:

1. A method for adsorbing and removing a hydrocarbon in a gas phase, which comprises contacting an adsorbent for a hydrocarbon, which adsorbent comprises a calcined beta zeolite showing a powder X-ray diffraction such that the sum of X-ray diffraction intensities at lattice spacings d=1.15±0.03 nm and d=0.397±0.01 nm, is at least 90% of the diffraction intensity at d=0.346±0.01 nm of Catalysis Society reference catalyst JRC-Z-HM-20(3), with the gas phase.

2. The method according to claim 1, wherein the hydrocarbon to be adsorbed and removed is a straight chain paraffin having at least 7 carbon atoms, a straight chain olefin having at least 7 carbon atoms, and/or a polycyclic aromatic compound.

3. The method according to claim 1, wherein the hydrocarbon to be adsorbed and removed is a straight chain paraffin having from 10 to 18 carbon atoms, or a straight chain olefin having from 10 to 18 carbon atoms.

4. The method according to claim 1, wherein the beta zeolite contains a transition metal.

5. The method according to claim 4, wherein the transition metal is at least one member selected from Cu and Ag.

6. A method for purifying an exhaust gas, which comprises contacting an exhaust gas-purifying catalyst comprising (1) an adsorbent for a hydrocarbon which comprises a calcined beta zeolite showing a powder X-ray diffraction such that the sum of X-ray diffraction intensities at lattice spacings d=1.15±0.03 nm and d=0.397±0.01 nm, is at least 90% of the diffraction intensity at d=0.346±0.01 nm of Catalysis Society reference catalyst JRC-Z-HM-20(3), and (2) a nitrogen oxide removing catalyst having an active metal contained in a porous material, with the exhaust gas.

7. The method according to claim 6, wherein the nitrogen oxide-removing catalyst is one having at least one active metal selected from noble metals consisting of Pt, Pd, Ir and Rh, contained in a porous material, and the average particle size of the noble metals is at least 10 nm.

8. A method for adsorbing and removing a hydrocarbon from a gas phase, comprising:

contacting an adsorbent for a hydrocarbon which is a straight chain paraffin or olefin, each having at least 7 carbon atoms, and/or a polycyclic aromatic compound, which adsorbent comprises a calcined β-zeolite showing a powder X-ray diffraction pattern such that the sum of X-ray diffraction intensities at lattice spacings d=1.15±0.03 nm and d=0.397±0.01 nm, is at least 90% of the diffraction intensity at d=0.346±0.01 nm of Catalysis Society reference catalyst JRC-Z-HM-20(3), with the gas phase.

9. A method for purifying an exhaust gas, which comprises:

contacting an exhaust gas-purifying catalyst comprising (1) an adsorbent that is a calcined β-zeolite showing a powder X-ray diffraction pattern such that the sum of X-ray diffraction intensities at lattice spacings d=1.15±0.03 nm and d=0.397±0.01 nm, is at least 90% of the diffraction intensity at d=0.346±0.01 nm of Catalysis Society reference catalyst JRC-Z-HM-20(3) for a hydrocarbon which is a straight chain paraffin or olefin, each having at least 7 carbon atoms, and/or a polycyclic aromatic compound, and (2) a nitrogen oxide removing catalyst having an active metal contained in a porous material, with the exhaust gas.

* * * * *